May 6, 1941.  M. H. CARPENTER  2,241,080
GROOVED PLYWOOD FACING
Filed Sept. 7, 1940
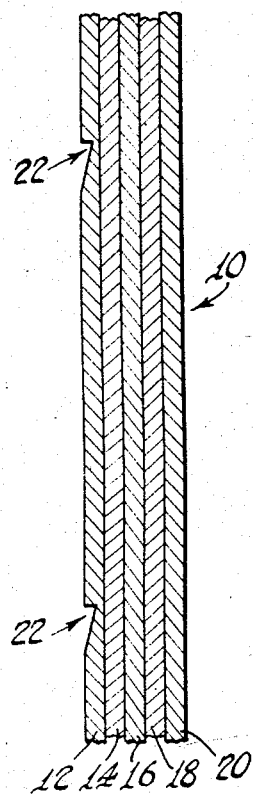
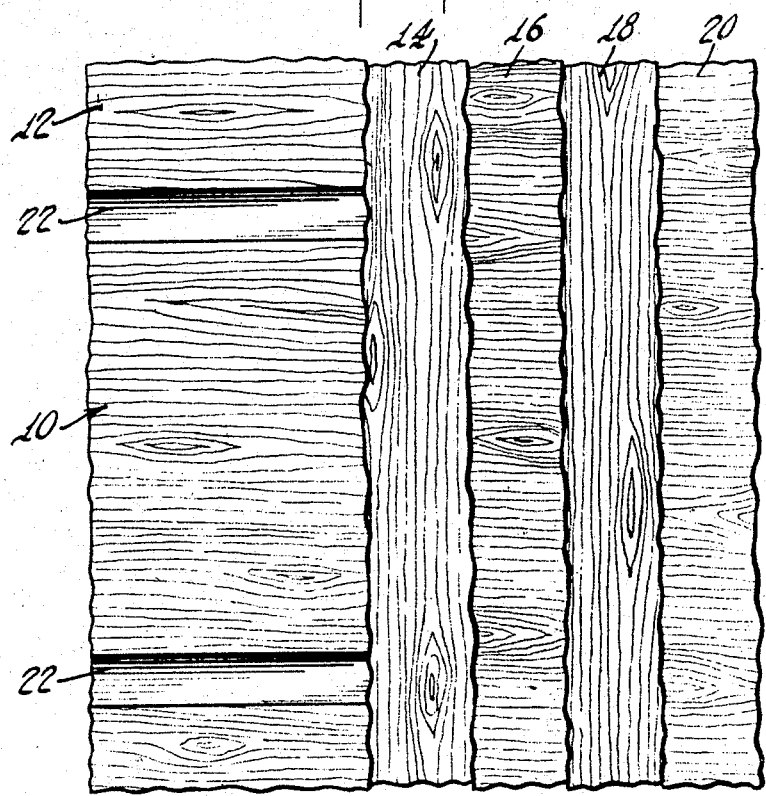
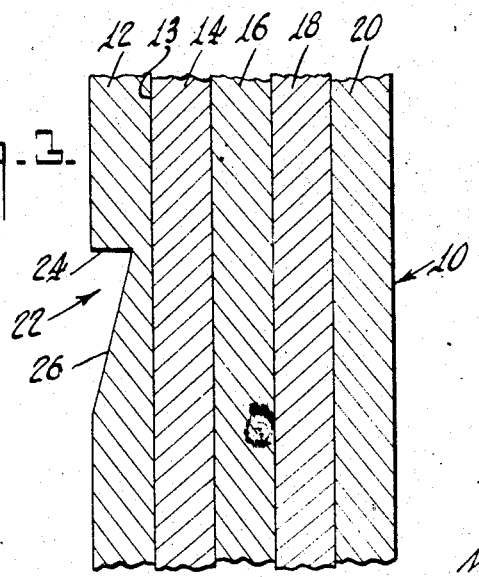
INVENTOR
*Miles H. Carpenter.*
BY *Dyke & Schaines*
ATTORNEYS Patented May 6, 1941

2,241,080

UNITED STATES PATENT OFFICE 2,241,080

GROOVED PLYWOOD FACING

Miles H. Carpenter, Merrick, N. Y., assignor to Duramore Buildings, Inc., Brooklyn, N. Y., a corporation of New York Application September 7, 1940, Serial No. 355,733

1 Claim. (Cl. 20—91)

Plywood panels have many advantages for exterior building facing, including lightness, cheapness and strength. However, either aesthetic considerations or habitual prejudice cause many persons to dislike a smooth, flat expanse, particularly on residential buildings. In order to suit the requirements of many purchasers, the exterior walls must be finished in clapboarding or material giving the same visual effect.

The outstanding visual feature of clapboarding is the horizontal lines delineated by the joints and which stand out as shadow lines due to the grooves left by the overlapping or partially overlapping ends of the clapboards. In the case of panels of solid lumber it would be comparatively easy to form grooves to give the same visual effect as the clapboard joints. In the case of plywood, however, the strength of the composite panel depends directly on the number of built-up layers. With alternate layers having their grains extending at right angles to each other, as is usual, the layer or lamination whose grain extends in one direction imparts certain elements of strength to the panel and withstands certain strains while other elements of strength are imparted and other strains withstood by the laminations whose grain runs in the opposite direction.

The forces of strain are particularly resisted by the joints between the laminations. If the bond between the laminations is broken, then a material portion of the strength of the panel is lost, this being somewhat critical at each plane of bond. For example, a cut half way through one of the laminations will reduce the strength somewhat. A cut all the way through one of the laminations which thereby breaks the bond at the point where the grains run in opposite directions will reduce the strength more than twice as much as the original cut.

When providing grooves in a laminated plywood panel, two opposing and more or less incompatible requirements must be met. The groove must be pronounced enough to give a reasonably prominent horizontal line apparent to the eye, and at the same time the groove must not extend deeply into the plywood panel because doing so would tend to impair the strength of the panel and require that a thicker and therefore more expensive panel be used.

The present invention resolves these two apparently incompatible requirements in that it produces a pronounced shadow line and leaves the panel with practically its entire original strength.

In the accompanying drawing,

Fig. 1 is an end view of a portion of a panel provided with shadow line grooves in accordance with my invention;

Fig. 2 is a front view thereof with successive laminations broken away; and

Fig. 3 is an enlarged detail of a portion of Fig. 1.

The plywood panel 10 is composed of more than one lamination of plywood, in this instance five laminations, 12, 14, 16, 18 and 20. The grains of alternate laminations run in opposite directions. In the form shown the grains of laminations 12, 16 and 20 run horizontally, while the grains of laminations 14 and 18 run vertically.

In the face lamination 12, grooves 22, 22 are cut. It is to be noted that these grooves are parallel to each other and parallel to the general grain direction in the face lamination 12 in which they are formed. The grooves 22 extend into the lamination 12 to a material extent but less than the whole thickness of this lamination. Thus they do not cut the joint 13 between laminations 12 and 14 but leave the inner surface of the lamination 12 in continuous unbroken bonded contact with the adjacent face of lamination 14. Preferably the grooves 22 are cut in to a depth of about two-thirds the thickness of the face lamination.

The grooves 22 are formed with their upper sides 24 extending in horizontally at right angles to the face of the panel. The lower sides 26 slant downwardly and outwardly and the width is preferably about four times as great as the width of the upper side 24.

The strength of the composite panel in a vertical direction is concentrated principally in vertically grained laminations 14 and 18, while the strength in a horizontal direction is concentrated principally in horizontally grained laminations 12, 16 and 20. Inasmuch as each individual lamination contributes very little strength across its grain, the strength which face lamination 12 contributes, and the total strength of the composite panel, are not materially affected by the grooves 22 which run generally parallel to each other and to the grain of the lamination in which they are formed. The strength of this lamination 12 in the direction of its grain is substantially unimpaired, being affected only to the extent of 1 or 2%, or the like, and its strength in a vertical cross grain direction is comparatively little in any event, and therefore weakening in this regard does not materially affect the strength of the composite panel.

By having the upper side of groove 22 cut in sharp at a right angle, a sharp and pronounced shadow line from the light of the sky is achieved, while the tapered lower side of the groove provides a broadening of the shadow as seen by the eye, and at the same time water and dirt wash right down the sloping lower surface instead of lodging in the groove. Because the inner face of the lamination 12 where it is bonded to the adjacent lamination 14 is left continuous and unbroken, the building up of composite strength between these two laminations which act in opposite directions is not impaired. No breaks are provided where creeping or splitting could achieve a concentrated start. Likewise the bond itself is not exposed to be weakened by air, sunlight or the entry of water. In spite of the fact that I have made a series of cuts of substantial depth into the face of the panel and secured a prominent series of shadow lines, the strength and durability of the panel are not impaired to any material degree.

Having thus described a preferred embodiment of my invention, what I claim is:

A shadow-lined plywood facing panel comprising a plurality of bonded together wood laminations, the grains of adjacent laminations extending at right angles to each other, a plurality of grooves in the outermost of the laminations, said grooves being spaced-apart and parallel to each other to simulate weatherboarding, and parallel to the grain of the wood in said outermost lamina, said grooves extending through a substantial part of the thickness of the outer lamina but to a depth of less than its full thickness, whereby the bond between the outermost and its adjacent lamination is not broken or exposed, said grooves having their upper sides generally perpendicular to the face of the outermost lamina and their lower sides sharply angled downwardly and outwardly therefrom to cut across the grain striations in a plane different from the plane of the face of the outermost lamina, said lower sides being shadowed by the respective upper sides to form shadow lines within the grooves.

MILES H. CARPENTER.